United States Patent Office 3,389,118
Patented June 18, 1968

3,389,118
PAINT COMPOSITION
Simon R. Gordon, Minneapolis, Minn., assignor to Gordon Building Materials, Inc., Minneapolis, Minn., a corporation of Minnesota
No Drawing. Continuation-in-part of application Ser. No. 740,536, June 9, 1958. This application Dec. 3, 1962, Ser. No. 241,478
7 Claims. (Cl. 260—41)

The present application is a continuation-in-part of my copending application Ser. No. 740,536, filed June 9, 1958, and issued as Patent No. 3,067,058 on Dec. 4, 1962.

This invention is an improved paint for use as a primer or intermediate coat between a surface to be painted and a finish coat of paint; and the waterproof coating which results when said intermediate coat is applied to a surface and a suitable finish coat is applied on top of the intermediate coat.

The improved primer or intermediate coat includes the addition of polyvinyl alcohol and a metal salt containing a chloride ion to a portland cement-water paint, preferably an air entraining cement. The polyvinyl alcohol is added in sufficient quantity that the portland cement no longer acts like cement and the chloride ions seem to function to produce hardening, except in the case of calcium chloride which does not seem to cause the paint to glaze or harden upon curing by repeated wettings and dryings after the manner of the other metal salts. Single hydrated lime and zinc sulphate may also be included as part of the ingredients of the primer composition.

In the aforesaid copending application there is disclosed and claimed a similar paint composition in which the metal chloride is a salt of an alkali metal, and specifically sodium chloride. It has now been discovered that an effective primer composition may be prepared by the use of water soluble metal chlorides other than the alkali metal chlorides.

Such a primer has the property of substantially preventing or reducing the loss of water from the liquid primer paint when it is first applied over porous surfaces so that the intermediate coat can be applied to such surfaces without the necessity for pre-wetting the surface. It also has the property of adhering very readily to unglazed surfaces, and of forming a heterogeneous mixture with whatever protrusions, pores, and voids exist in a substrate of non-glazed composition, and with any particles of dust or old paint or the like which are present on the substrate.

When an appropriate paint finish coat, described in detail below, is applied over the substrate and over the intermediate primer of the invention, the intermediate primer has the property of forming a swelling mixture with the finish coat thus locking the combined coating to the surface and bonding the adjacent surfaces of the finish coat and the intermediate coating together.

The property of the primer of the present invention which allows it to be applied to a porous wall, such as one of cement building blocks, without the loss of significant quantities of water into the porous surface is apparently due to the polyvinyl alcohol in the solution filling pores or other voids and forming a shield against the further passage of water. Apparently the intermediate coat of the present invention, after it has dried, and before a finish coat is applied or curing has occurred, as by repeated wetting and drying, is water resistant only in one direction. That is to say, tests have indicated that since polyvinyl alcohol is soluble in water and in paint vehicles, water or a paint vehicle applied to the uncured outer surface of the intermediate coating of the invention will cause the polyvinyl alcohol to go back into solution. In this form, it can be washed or leached from the surface on which it is painted by application of excess quantities of water or other vehicle solvents. On the other hand, addition of water to the intermediate coating from the under side, for example by seepage through a cement building block, causes the only polyvinyl alcohol immediately adjacent the substrate to tend to soften and go back into solution until curing occurs. This wetting causes these molecules to expand and again block the pores through which the water is attempting to travel thereby sealing the substrate with respect to this water seepage. Eventually alternate wetting and drying causes the primer to harden and glaze in most instances thus producing a permanent water repellant surface. When calcium chloride is used, it appears that even repeated wetting and drying fails to cause the primer to glaze. Nevertheless, used with an appropriate finish coat, it seems to swell and lock to a surface and create a water-proofing covering.

In preparing an intermediate coating of the present invention, any suitable polyvinyl alcohol may be used. The grade designated as PA-5 by Colton Chemical Company has been found to be very effective. In practice, the polyvinyl alcohol in the form of a dry powder is added to the dry constituents. Dry polyvinyl alcohol in terms of parts per weight per 39 parts of portland cement may be used in the range of 3 to 4½ parts, but 4 parts is the most satisfactory quantity. Portland cement with this quantity of polyvinyl alcohol present does not act like portland cement in that it will not set up or harden without the addition of the metal salt.

While it appears that any water soluble metal chloride is operative to produce the primer composition of the present invention, certain of these are impractical by reason of high cost, lack of ready availability, toxicity and the like. For this reason, the most practical metal salts known to me that contain chloride ions would include the following: calcium chloride, magnesium chloride, strontium chloride, magnesium chloride, cupric chloride, ferrous and ferric chloride, cobalt chloride, nickel chloride, zinc chloride, cadmium chloride, tin chloride, and aluminum chloride. As far as experience shows, any metal chloride salt will function providing it is soluble, and does not decompose in water. Limitations placed on the group are primarily matters of commercial availability, etc. On the other hand, it is not intended to exclude any of these as non-functional, since changes in availability of products or techniques for making them available and in useable forms may alter the present commercial picture with respect to various of these compounds.

The range of metal salt measured in parts by weight to 39 parts by weight of portland cement is ½ to 1½. This range is related to the amount of polyvinyl alcohol used and should be varied therewith. The most desirable quantity for use with 39 parts of portland cement is one part metal salt.

While any portland cement will function, it is preferred to use an air entraining cement as this has been found to be the most satisfactory.

The range of lime used measured again in parts by weight as compared to my standard of 39 parts of portland cement is 2½ to 3½. It should be varied with the polyvinyl alcohol and metal salt; the preferred quantity is 3 parts.

The range of zinc sulphate that is used relative to 39 parts of portland cement is ½ to 1½ parts by weight. It is varied comparably to all the other variables, and the preferred amount is one part. Both zinc sulphate and lime act to make the product remain an easily brushed, rolled or sprayed paint. I have no idea why they work better when used together than either does used separately in larger quantities, but they do.

A general illustration of the formula for this intermediate coating includes the following range of proportions of dry ingredients in parts by weight. For each 39 parts air entraining portland cement:

| | Parts |
|---|---|
| Single hydrated lime | 2½ to 3½ |
| Polyvinyl alcohol | 3 to 4½ |
| Non toxic, metal salt containing a chloride ion from the group named above | ½ to 1½ |
| Zinc sulphate | ½ to 1½ |

These dry constituents are thoroughly mixed together, and six pounds of this mixture may be placed in a one gallon container with enough water added to make one gallon of liquid paint. The paint is stirred until it is smooth. It can be applied immediately, although an aging of 15 to 20 minutes will improve the consistency. The coating is then ready to be applied to the substrate to be painted through the instrumentality of a nylon or hair brush, spray or roller.

Some specific examples of optimum formulae in terms of parts by weight are:

No. 1

For each 39 parts portland air entraining cement:

| | Parts |
|---|---|
| Polyvinyl alcohol | 4 |
| Magnesium chloride | 1 |
| Zinc sulphate | 1 |
| Lime, single hydrated | 3 |

No. 2

As in No. 1 but substitute 1 part ferric chloride for 1 part magnesium chloride.

No. 3

As in No. 1 but substitute 1 part zinc chloride for 1 part magnesium chloride.

The same formula into which calcium chloride is substituted in the same quantity will produce an undercoat or primer that will have all of the characteristics of this primer except that of glazing as a result of two to four rewettings and dryings after it initially dries. Covering with a suitable glazing or hardening and otherwise appropriate finish coat, however, permits this primer using calcium chloride to function well in producing a waterproof covering.

The intermediate coating is allowed to dry on the substrate, and when dry, it will be opaque, flat, and non-rubbing. Except for primer made using calcium chloride, this primer will if cured by alternate wetting and drying for two or three times or the like, produce a glazed non-soluble surface that will not wash off or leach as a result of water being placed on it even in large quantities. Furthermore, once the primer coat has thus been cured, either from purposeful or accidental alternate wetting and drying, no finish coat will combine with it to produce the waterproof coating referred to above.

Accordingly, in order to produce a waterproof coating or any bonding between the finish coat and the primer, the finish coat must be put on before the primer coat cures. In general, when it is desired to produce a waterproof coat and particularly one which will resist water pressures, as used to waterproof the internal wall of a basement, the finish coat is preferably one that falls in the general classification known in some parts of the country as breather type latex paints or in other parts of the country as breather type vinyl paints. Specifically any paint using various thermoplastics produced as an aqueous dispersion of high molecular weight polymer prepared by emulsion polymerization will produce a suitable finish coat. Specifically, there are two groups of paints which are considered to be the most satisfactory for use as a finish coat, particularly where it is desired to have a total coating which will resist water head pressure as in waterproofing a basement wall, the exterior of which allows water seepage. These two groups are polyvinyl acetate emulsion breather paint which is more specifically identified, perhaps, as meeting Federal Specification T-P-0055, and second group that appears to be equally effective with the undercoat of this invention known as acrylic emulsion breather paints with a Federal Specification T-T-P-0019. In addition it is possible to use portland cement paint which meets Government Federal Specification T-T-P-21, although the use of such a paint as the final coat would probably not produce a satisfactory waterproofing to resist water heads in waterproofing a basement wall that is subject to seepage. Since there are myriads of paints alledging to be breather paints all of which will probably function, at least to some extent, with this undercoat, a ready means of determining whether the paint will function in a most satisfactory manner is to mix equal parts of the proposed finish coat paint and the mixed undercoat in any small container and observe the results. If the proposed finish coat is one that will produce the most satisfactory results with this primer, a rather rapid swelling and solidification of the mixture can be observed visually. This swelling should take place in five minutes or less. Failure of such an action to take place between a proposed finish coat and this primer does not mean that an unsatisfactory finish will be achieved but only that the finish achieved will not have the same powers of resisting water head pressures as would be the case if swelling is seen.

This undercoat has an additional advantage over many previously suggested primers in that it will grip not only porous wall surfaces such as cement or light weight aggregate or block and the like but also will adhere with almost unbelievable tenacity troweled concrete, cement or other smooth or even glazed surfaces such as basement floors and the like. For this reason, this combination of a primer with a finish coat can totally waterproof interior basement walls, because the paint can be continued as an endless waterproofing coating down the wall and across the crack joining the wall to the floor providing a totally waterproof seal between the wall and the floor surface. In this connection a water mixed Portland cement paint carrying Federal Specification T-T-P-21 will not produce such swelling with the undercoat and is not recommended as a finish coat when the surface being coated is a wall that may be subjected to water head pressures.

Upon application of a suitable finish coat to the dry, uncured intermediate coating, the polyvinyl alcohol of the intermediate coating which comes in contact with the finish coat will soften and tend to go into solution with the solvent in the finish coat. Consequently the two become mutually interbonded into a total coating. Upon the solidification of the finish coat, whether by setting up and drying of the cement in the case of a cement-water finish paint, or by oxidation or evaporation of the vehicle in the case of other paints, the adjacent surfaces of the finish and intermediate coating will become permanently interbonded to each other. The intermediate coating is already bonded to the substrate, and both coats are thereby permanently secured to the substrate. Because of this mutual interbonding of the intermediate coating with both the substrate and the finish coat and swelling as the two coatings interact, the properties of the total coating are substantially and unexpectedly improved over the properties of the sum of the two coatings taken separately. For example, while the finish coating may be insoluble, it is not waterproof; in the case of the primer alone, it is not waterproof. Furthermore, two coats of either would not be waterproof nor resist water pressure heads successfully. When one coat is painted on top of the other, however, the result of the use of the two non-waterproof coatings is a resultant coating which is waterproof. When one of the recommended breather paints is used, a waterproofing that will resist head pressure in an otherwise leaking masonry wall will result.

Also, because of the mutual interbonding between layers, the resistance of the finish coating to peeling action due to extreme changes in temperature is very substantially enhanced. That is to say, the protective coating which is constituted as the intermediate and finish coating one on the other, resists much higher temperatures than could the finish coating painted directly on the substrate, and likewise, resists extremely cold temperatures much better without exhibiting peeling characteristics. For example, the interbonded finish and intermediate coating of the present invention, when applied over the metal of a display sign will not peel from the sign due to the action of the weather and extremely cold temperatures on it.

It is to be noted that, because of the water-blocking characteristics of the intermediate coating, it is not necessary to pre-wet a porous substrate either when the intermediate coating is applied, or later when a finish coating of water-cement is applied over the intermediate coating. In the case of the application of a water-cement finish coating over the intermediate coating, this is because the solvent in the finish coating causes the polyvinyl alcohol to tend to soften and go back into solution and hence to block penetration of water from the finish liquid coating through the intermediate coating. This water is, therefore, available to allow the finish coating to cure in a satisfactory manner.

It is apparent that many modifications and variations of the invention as hereinbefore set forth may be made without departing from the spirit and scope thereof. The specific embodiments described are given by way of example only and the invention is limited only by the terms of the appended claims.

What is claimed is:

1. A composition of matter for producing a water based coating material consisting essentially of portland cement, polyvinyl alcohol and a metal salt containing a chloride ion selected from the group consisting of calcium chloride, magnesium chloride, strontium chloride, manganese chloride, cupric chloride, ferrous chloride, ferric chloride, cobalt chloride, nickel chloride, zinc chloride, cadmium chloride, tin chloride and aluminum chloride, the dry ingredients being present in the proportion of about 39 parts by weight portland cement, about 3 to 4½ parts by weight polyvinyl alcohol and about ½ to 1½ parts by weight of metal salt containing a chloride ion.

2. The composition of matter of claim 1 further characterized in that the portland cement is an air entraining cement.

3. The composition of water of claim 1 further characterized in that lime is present in the amount of from about 2½ to 3½ parts by weight and zinc sulfate is present in the amount from about ½ to 1½ parts by weight.

4. The composition of matter of claim 1 further characterized in that said dry ingredients are present in the proportion of about 39 parts by weight of portland cement, about 3½ to 4 parts by weight of polyvinyl alcohol and about 1 part by weight of metal salt containing a chloride ion.

5. The composition of matter of claim 3 further characterized in that the dry ingredients are present in the proportion of about 39 parts by weight of portland cement, about 3½ to 4 parts by weight of polyvinyl alcohol, about 1 part by weight of metal salt containing a chloride ion, about 3 parts by weight of lime and about 1 part by weight of zinc sulfate.

6. The composition of matter of claim 1 further characterized in that said dry ingredients are admixed with water in the proportion of about 6 pounds of dry ingredients of water sufficient to make about 1 gallon of liquid composition.

7. The composition of matter of claim 3 further characterized in that said dry ingredients are admixed with water in the proportion of about 6 pounds of dry ingredients and water sufficient to make about 1 gallon of liquid composition.

References Cited
UNITED STATES PATENTS

| | | | |
|---|---|---|---|
| 1,644,964 | 10/1927 | Welch | 106—90 |
| 1,794,526 | 3/1931 | Lundteigen et al. | 106—90 |
| 2,311,233 | 2/1943 | Jaenicke et al. | 260—41 |
| 2,576,955 | 12/1951 | Ludwig | 260—41 |
| 2,733,995 | 2/1956 | Robinson | 260—41 |
| 2,769,794 | 11/1956 | Coler et al. | 260—41 |
| 3,011,908 | 12/1961 | Carlson | 117—70 |
| 3,104,982 | 9/1963 | Shanley | 117—70 |

MORRIS LIEBMAN, *Primary Examiner.*

L. T. JACOBS, *Assistant Examiner.*